US010315254B2

(12) United States Patent
Bloss et al.

(10) Patent No.: US 10,315,254 B2
(45) Date of Patent: Jun. 11, 2019

(54) METHOD OF MACHINING DISSIMILAR MATERIALS

(71) Applicant: FORD MOTOR COMPANY, Dearborn, MI (US)

(72) Inventors: Patrick Russell Bloss, Cincinatti, OH (US); Brian Scott Phillips, Liberty Township, OH (US)

(73) Assignee: Ford Motor Company, Deaborn, MI (US)

( * ) Notice: Subject to any disclaimer, the term of this patent is extended or adjusted under 35 U.S.C. 154(b) by 704 days.

(21) Appl. No.: 14/707,300

(22) Filed: May 8, 2015

(65) Prior Publication Data

US 2016/0243623 A1 Aug. 25, 2016

Related U.S. Application Data

(60) Provisional application No. 62/119,559, filed on Feb. 23, 2015.

(51) Int. Cl.
*B23B 1/00* (2006.01)

(52) U.S. Cl.
CPC ............ *B23B 1/00* (2013.01); *B23B 2220/04* (2013.01); *B23B 2222/84* (2013.01);
(Continued)

(58) Field of Classification Search
CPC ........ B23C 2220/00; B21K 1/00; B21H 5/00; B23B 5/16; B23B 2200/04;
(Continued)

(56) References Cited

U.S. PATENT DOCUMENTS 3,430,390 A * 3/1969 Wolcott ............... B23D 61/185 451/164
4,126,064 A * 11/1978 Tarrant ...................... B23B 5/16 29/898.066

(Continued)

FOREIGN PATENT DOCUMENTS

| | | | |
|---|---|---|---|
| CN | 2256353 | Y | 6/1997 |
| CN | 102233509 | A | 11/2011 |
| CN | 102441771 | A | 5/2012 |

OTHER PUBLICATIONS

Chinese Office Action dated Aug. 22, 2018 for Chinese Application No. 201610099186, 5 pages.

*Primary Examiner* — Willmon Fridie, Jr.
(74) *Attorney, Agent, or Firm* — Ray Coppiellie; Brooks Kushman P.C.

(57) ABSTRACT

Methods of machining a component including multiple dissimilar materials are disclosed. One method may include making a first cut in the component to remove at least a portion of a hardest material in the component and making a second cut in the component along a second cutting-path that does not include the hardest material. The first cut may expose a cut surface in the component and the second cut may extend through the cut surface. The cuts may be made using a turning operation and different cutting tools may be used for the first and second cuts. The hardest material may have a hardness of at least 50 HRC and the remaining materials may have a hardness of at most 45 HRC. The disclosed methods may be used to form a thrust face surface in a shell and sun gear assembly to extend tool life and reduce scrap.

20 Claims, 7 Drawing Sheets

(52) U.S. Cl.
CPC ....... *B23B 2228/24* (2013.01); *B23B 2240/16* (2013.01); *B23B 2260/07* (2013.01)

(58) Field of Classification Search
CPC . B23B 2200/84; B23B 2270/00; B23P 15/14; F16H 1/28; F16H 2001/2872; F16H 2001/2881; B23F 19/10
See application file for complete search history.

(56) References Cited

U.S. PATENT DOCUMENTS

| | | | | |
|---|---|---|---|---|
| 5,074,080 | A * | 12/1991 | Erhardt | B23F 19/05 451/219 |
| 5,685,797 | A * | 11/1997 | Barnsby | F16C 33/12 384/625 |
| 6,102,636 | A * | 8/2000 | Geise | B23C 5/2213 407/53 |
| 6,517,772 | B1 * | 2/2003 | Woolf | B21H 5/022 419/28 |
| 7,461,441 | B2 * | 12/2008 | Langerfeld | B23F 5/205 29/40 |
| 8,523,634 | B2 * | 9/2013 | Woelfel | B23F 1/02 409/192 |
| 9,339,909 | B2 * | 5/2016 | Affaticati | B23F 1/065 |
| 9,399,279 | B2 * | 7/2016 | Breith | B24B 53/062 |
| 2002/0160876 | A1 * | 10/2002 | Lu | F16H 57/08 475/331 |
| 2004/0049918 | A1 * | 3/2004 | Nishi | B23P 15/14 29/893 |
| 2005/0211029 | A1 * | 9/2005 | Zurecki | B23P 25/003 82/1.11 |
| 2006/0030125 | A1 * | 2/2006 | Sackrison | H01L 33/0095 438/460 |
| 2012/0177457 | A1 * | 7/2012 | Nagata | B23F 5/163 409/26 |
| 2016/0008890 | A1 * | 1/2016 | Rishton | B23B 5/167 407/43 |
| 2016/0243623 | A1 * | 8/2016 | Bloss | B23B 1/00 |
| 2017/0252842 | A1 * | 9/2017 | Hanus | B23F 21/005 |

* cited by examiner

METHOD OF MACHINING DISSIMILAR MATERIALS

CROSS-REFERENCE TO RELATED APPLICATIONS

This application claims the benefit of U.S. provisional application Ser. No. 62/119,559 filed Feb. 23, 2015, the disclosure of which is hereby incorporated in its entirety by reference herein.

TECHNICAL FIELD

The present disclosure relates to methods of machining dissimilar materials, for example, materials of differing hardness.

BACKGROUND

In order to provide or create a flat surface, it is sometimes necessary to perform a cutting operation. In the case of a shell and sun gear assembly, this may involve a thrust face surface cut that cuts across materials having different properties. For example, the sun gear and the shell may be made of different material compositions and/or their materials may have different hardnesses. In addition, a weld between the gear and the shell may add another different material composition and/or hardness value. The cut, which may be referred to as a thrust face machining operation, may be performed by a turning operation wherein the assembly is rotated and cut by a non-rotating tool.

SUMMARY

In at least one embodiment, a method of machining a component including multiple dissimilar materials is provided. The method may include making a first cut in the component to remove at least a portion of a hardest material in the component and making a second cut in the component along a second cutting-path that does not include the hardest material.

In one embodiment, the first cut exposes a cut surface in the component and the second cut extends through the cut surface. The component may include at least two materials having a hardness that is less than that of the hardest material. The second cutting-path may extend through each of the at least two materials having a hardness that is less than that of the hardest material. In one embodiment, the first and second cuts include a turning operation. The first cut and the second cut may be made using different cutting tools. In one embodiment, the hardest material has a hardness of at least 50 HRC and the second cutting-path extends through materials having a hardness of at most 45 HRC. In another embodiment, the first cut is made at an angle oblique to a surface of the hardest material and the second cut is made substantially perpendicular to the surface of the hardest material. The multiple dissimilar metals may all be steel. The first cut may initially contact the hardest material. The first cut may extend through at least three materials.

In at least one embodiment, a method of machining a component including multiple dissimilar materials is provided. The method may include making a first chamfer cut in the component to remove at least a portion of a hardest material in the component and expose a chamfer surface and making a second cut in the component through the chamfer surface along a second cutting-path that consists of a plurality of materials that are softer than the hardest material.

The chamfer surface may include a region of the hardest material and at least one region of a material softer than the hardest material. In one embodiment, the first and second cuts include a turning operation and the first and second cuts are made using different cutting tools. In another embodiment, the hardest material has a hardness of at least 50 HRC and the plurality of materials each have a hardness of at most 45 HRC. The first cut may be made at an angle oblique to a surface of the hardest material and the second cut may be made substantially perpendicular to the surface of the hardest material. The first cut may initially contact the hardest material. The first cut may extend through at least three materials.

In at least one embodiment, a method of forming a thrust face surface in a gear assembly is provided. The method may include making a chamfer cut in a gear to remove at least a portion of a case-hardened surface of the gear and making a thrust face surface cut along a cutting-path oblique to the chamfer cut and substantially perpendicular to a center axis of the gear, the cutting-path not extending through the case-hardened surface of the gear. In one embodiment, the cutting path extends through a weld bead and a shell of the gear assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
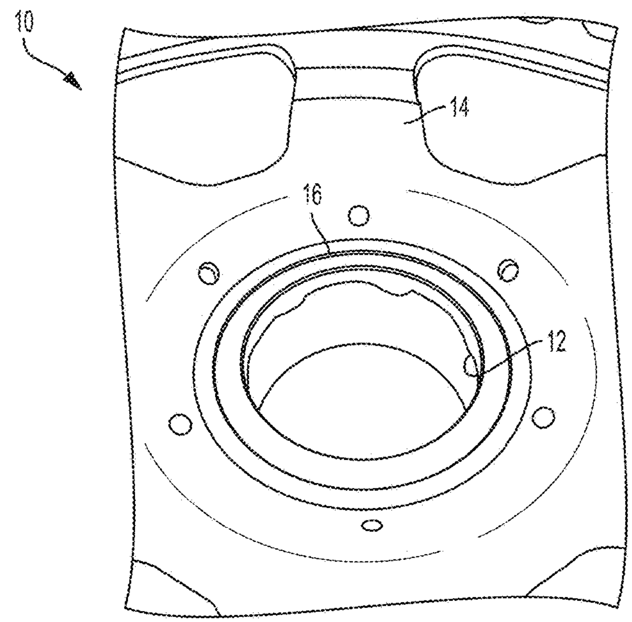
FIG. 1 is a perspective view of a shell and sun gear assembly prior to machining.
Figure 2:
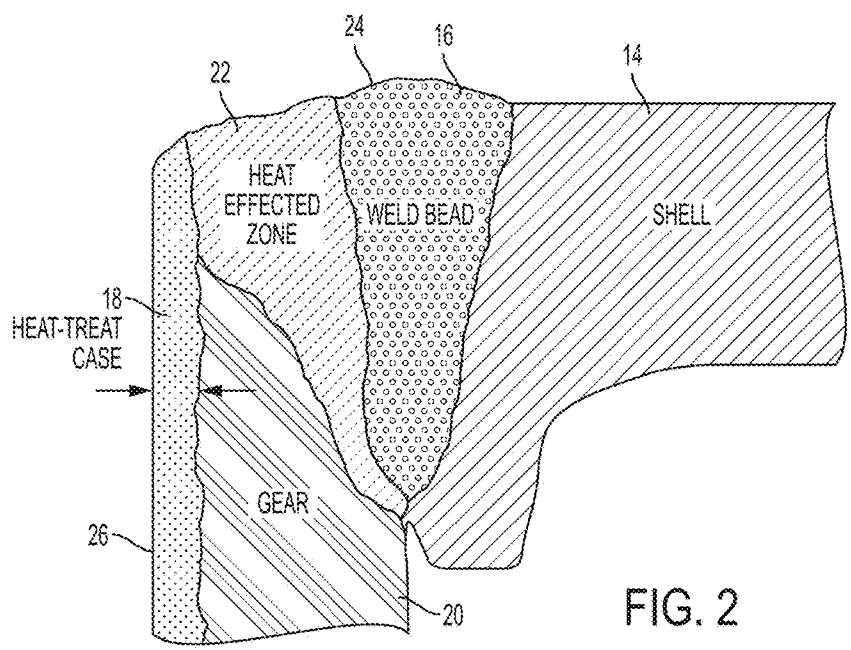
FIG. 2 is a cross-section of a shell and sun gear assembly prior to machining.

With reference to FIGS. 1 and 2, a pre-machined shell and sun gear assembly 10 is shown. The assembly 10 includes a gear 12 and a shell 14, with a weld 16 attaching the gear 12 and shell 14 together. The gear 12 may be surface hardened or case hardened, such that at least a portion of its outer surface 18 has a higher hardness value (e.g., Rockwell C) than the bulk 20. As known in the art, a case hardened surface is understood to have a non-negligible depth (e.g., not two-dimensional). The depth of the case hardening may depend on the method used and the application of the component, and may be nanometer, microns, or millimeters deep. Non-limiting examples of case hardening methods include flame/induction hardening, carburizing, nitriding, and carbonitriding. The shell 14 may be formed of a material having a relatively low hardness compared to the gear 12 (the surface or the bulk and surface). The weld 16 may also have a hardness value, which may differ from the gear 12, bulk 20 and/or surface 18, and the shell 14. As is known in the art of welding, there may be a heat affected zone (HAZ) 22 between the weld 16 and the gear 12 (or, alternatively, between the weld 16 and the shell 14). The HAZ generally refers an area/zone/region where the base material (e.g., metal) has not melted but has had its microstructure and/or properties altered by the weld. Accordingly, the HAZ 22 may have a hardness value that differs from the case 12 (surface and/or bulk), the shell 14, and/or the weld 16. The case hardened surface 18 may be the hardest material in the assembly 10, or at least harder than the bulk 20, HAZ 22, weld 16, and shell 14.

As a result, the assembly 10 shown includes five dissimilar materials. However, the assembly 10 is an example, and fewer or greater than five dissimilar materials may be present. For example, 2, 3, 4, 6, 7, or more materials. As used herein, "dissimilar materials" may refer to materials with different compositions or different properties. For example, the surface 18 and the bulk 20 of the gear 12 may have the same chemical composition, but the surface may have different properties (e.g., a higher hardness) due to a material processing operation, such as case hardening. In another example, the gear 12 and the shell 14 may be formed of different types of steel, and therefore may have different compositions (e.g., different alloying elements and/or concentrations). Components that have different compositions may also have different properties (e.g., hardnesses), although not necessarily.

Figure 3:
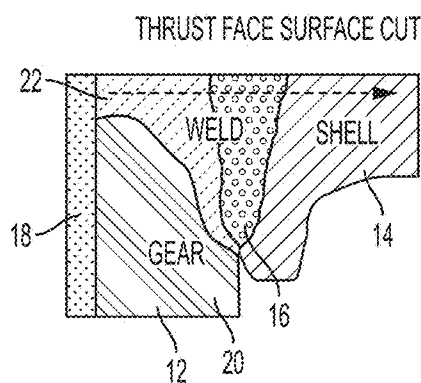
FIG. 3 is a schematic of a conventional single-cut thrust face surface cut machining operation.
Figure 4A:
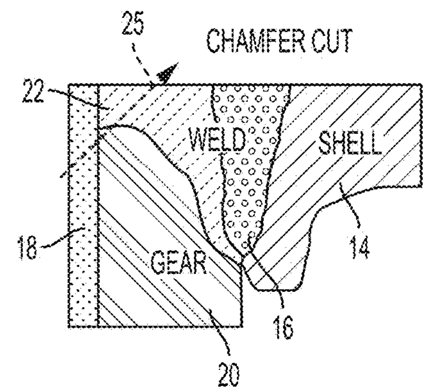
FIG. 4A is a schematic of a first step of a multiple-cut thrust face surface cut machining operation, according to an embodiment.
Figure 4B:
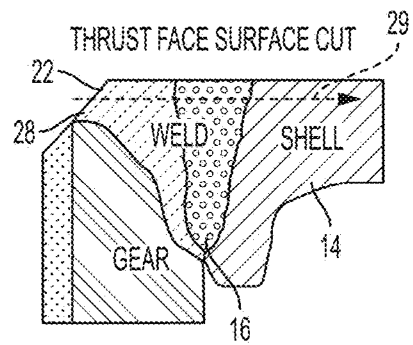
FIG. 4B is a schematic of a second step of a multiple-cut thrust face surface cut machining operation, according to an embodiment.
Figure 4C:
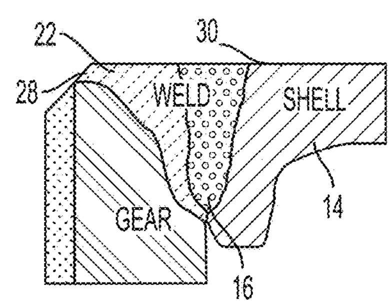
FIG. 4C is a schematic of a component following a multiple-cut thrust face surface cut machining operation, according to an embodiment.

With reference to FIG. 3, an example of a thrust face surface cut is shown in cross-section. As described above, a thrust bearing (not shown) may be positioned and in contact with the shell and sun gear assembly (SSG assembly) 10. In order to work effectively, the thrust bearing may be required to contact a flat surface on the SSG assembly 10. As used herein, "flat surface" may refer to a substantially planar surface. In the context of the SSG assembly 10, the flat surface may be perpendicular or substantially perpendicular to a center axis of the gear 12. As shown in FIG. 2, the welding process may create an uneven top surface 24 on the SSG assembly 10 where the gear 12 is welded to the shell 14 by the weld bead 16.

Conventionally, a single-cut machining operation may be performed to create a flat top surface, as indicated by the arrow in FIG. 3. As described above, in the SSG assembly 10, the gear 12 may be surface hardened or case hardened, such that at least a portion of its outer surface 18 has a higher hardness value (e.g., Rockwell C) than the bulk 20. Accordingly, the standard single-cut machining operation has to cut through the hard surface 18 first and subsequently cut through the softer bulk 20, HAZ 22, weld 16, and shell 14. The single-cut thrust face surface cut is typically performed by a turning operation. Turning is a machining operation that is known in the art and will therefore not be described in detail. In general, turning includes rotating a work piece and cutting it using a non-rotating tool. The tool may have a cutting insert or replaceable tip that includes the cutting edge.

Cutting tools and inserts are typically designed and constructed to cut certain types of materials, not a wide range. Some inserts are designed for cutting high hardness materials, while others are designed for cutting low hardness materials. However, with the conventional single-cut thrust face surface cut, the same tool or insert is used to cut through dissimilar materials (e.g., materials with different properties, such as hardness). It has been found that using a single tool to make a single cut for the thrust face surface cut results in poor tool life and a high scrap rate. It has been discovered that the cutting edge of the cutting insert is damaged by the initial hard surface 18 of the gear 12. The cutting edge is important for creating a smooth, clean cut in the remaining, softer materials (e.g., bulk, HAZ, weld, shell) during the cut. Therefore, if the cutting edge of the insert is damaged, the new thrust face surface that is formed may have nicks, chips, burrs, or other defects that reduce its quality. If the surface is too damaged, the SSG assembly 10 may have to be scrapped, resulting in waste materials and increased costs.

With reference to FIGS. 4-7, embodiments of a new method 100 of machining through dissimilar materials are shown. FIGS. 4A-4C illustrate an embodiment of the method applied to the SSG assembly 10. Instead of a single cut, the machining operation (e.g., turning) is performed in multiple cuts (e.g., two or more). The first cut 25, shown in FIG. 4A and referred to as a diagonal, oblique, or chamfer cut, removes a portion of the hard surface 18 of the gear 12 in the region where the thrust face surface cut will be made. The chamfer cut 25 may also remove a portion of one or more of the bulk 20, the HAZ 22, the weld 16, and the shell 14, depending on the angle of the cut and how far down from the top surface 24 the cut is started.

There is no required angle of the chamfer cut relative to a wall 26 of the gear 12 (the wall being perpendicular or substantially perpendicular to the thrust face surface cut and parallel or substantially parallel to the center axis of the gear 12). The angle of the chamfer cut may be any angle that removes at least a portion of the hard surface 18 from a portion of the wall 26 where the thrust face surface cut will take place. In one embodiment, the chamfer cut may be made at an angle from the wall 26 towards the shell 14 (e.g., away from the center axis of the gear 12) of 1 to 89 degrees, or any sub-range therein. For example, the chamfer cut may be made at an angle of 5 to 85 degrees, 10 to 80 degrees, 20 to 70 degrees, 30 to 60 degrees, or 40 to 50 degrees. The height of the chamfer cut (e.g., the distance perpendicular from the top surface 24 to the start of the chamfer cut) may be any height that removes at least a portion of the hard surface 18 from a portion of the wall 26 where the thrust face surface cut will take place. In one embodiment, the height of the chamfer cut may be from 0.1 to 50 mm, or any sub-range therein, such as 0.1 to 25 mm, 0.1 to 10 mm, 0.1 to 5 mm, 0.5 to 5 mm, 0.5 to 2.5 mm, or about 1 mm (e.g., ±0.5 mm).

The chamfer cut 25 may expose a chamfer surface 28 on the SSG assembly 10. The chamfer surface 28 includes at least a portion that does not include the hard surface 18. Depending on the angle of the chamfer cut and the distance from the top surface 24 to the start of the cut, the exposed chamfer surface 28 may include regions including one or more of the bulk 20, the HAZ 22, the weld 16, and the shell 14. The chamfer surface 28 may also include a portion of the hard surface 18, but not in the region where the thrust face surface cut will be made. In the embodiment shown in FIG. 4B, the chamfer surface 28 includes a bottom region of the hard surface 18 and a top region of primarily the HAZ 22.

After the chamfer cut, a second cut 29 may be performed, which may be a thrust face surface cut. The thrust face surface cut, shown in FIG. 4B, may form a thrust surface 30, shown in FIG. 4C. The thrust surface 30 may be flat, for example, perpendicular or substantially perpendicular to a center axis of the gear 12. To form the flat thrust surface 30, the thrust face surface cut may be a horizontal or transverse cut relative to the wall 26 and/or the center axis of the gear 12. In one embodiment, the thrust face surface cut may be perpendicular or substantially perpendicular to the wall 26 and/or the center axis of the gear 12. The thrust face surface cut may initially contact and cut through the chamfer surface 28 in an area or region that does not include the hard surface 18. The thrust face surface cut may initially contact an area or region that includes any of the other, softer materials, such as the bulk 20, HAZ 22, weld 16, or shell 14. In the embodiment shown in FIGS. 4B and 4C, the thrust face surface cut initially contacts a region of HAZ 22. The thrust face surface cut may then continue through the remaining materials (the weld 16 and the shell 14 in the embodiment shown) to form the thrust surface 30. Alternatively, the cut may be performed in the opposite direction, wherein the cut exits through the chamfer surface 28.

As a result of the chamfer cut, the cutting tool may avoid cutting through the hard surface 18 when making the thrust face surface cut. As described above, the hard surface 18 may damage the cutting insert of the cutting tool due to its very high hardness. By avoiding the hard surface 18 during the thrust face surface cut, the cutting insert of the tool may remain sharp and undamaged. This may allow the cutting insert to produce a very flat, smooth, clean thrust surface 30 that is free of nicks, chips, burrs, or other defects, resulting in reduced scrap. Avoiding the hard surface 18 may also significantly improve the tool life of the cutting insert, which may allow for lower costs and less down time due to tool replacement.

The tool or cutting insert used for the chamfer cut (e.g., first tool) may be different than the tool used for the thrust face surface cut (e.g., second tool). Since the chamfer cut still involves cutting through the hard surface 18, the cutting insert on the first tool may still be damaged during the cut. However, the chamfer surface 28 may have reduced quality requirements compared to the thrust surface 30. In one embodiment, the chamfer surface 28 may be substantially non-functional, other than to provide a surface in which to make the thrust face surface cut. If the chamfer surface has less (or no) quality requirements, then the type of damage that occurs during conventional, one-cut thrust face surface cuts may not be problematic for the chamfer surface cut. Accordingly, the first tool may not need to be replaced as often as tools used in single-cut operations, since a higher number and/or severity of defects may be acceptable on the chamfer surface 28 compared to the thrust surface 30. The second tool may only cut through relatively soft materials, at least compared to the hard surface 18, and therefore may sustain significantly less damage to the cutting edge of the insert compared to the first tool. As a result, the second tool may have an improved tool life compared to single-cut tools. Accordingly, the disclosed multiple-cut method including a first chamfer cut and a second thrust face surface cut may significantly reduce waste, equipment downtime, and equipment cost while also improving tool life and the quality of the thrust surface in the SSG assembly 10.

Since the chamfer cut and the thrust face surface cut may be performed by different tools (e.g., first tool and second tool), the tools may be tailored to the material being cut. Since the first tool is cutting a hard material, such as hard surface 18, a tool or cutting insert may selected that is designed or configured to cut very hard materials. For example, the cutting insert on the first tool may be a carbide, cubic boron nitride (CBN), or diamond. Since the second tool does not need to cut extremely hard materials (at least compared to the first tool), a tool or cutting insert may be selected that is designed or configured to have a long tool life while still providing a smooth, clean cut. Alternatively, the second insert may be a less expensive tool type, since its performance requirements may not be as high due to softer materials being cut. For example, the cutting insert on the second tool may be a carbide, carbon steel, high speed steel, cobalt, ceramic, or cermet. While it is contemplated that the first and second tools may be different or tailored to the material(s) being cut, it is also contemplated that the tools may use the same type of insert. While some non-limiting examples of suitable tool types have been listed, any cutting tool or insert that is suitable for the material being cut may be used for either tool, as will be apparent to one of ordinary skill in the art in view of the present disclosure.

Figure 5:
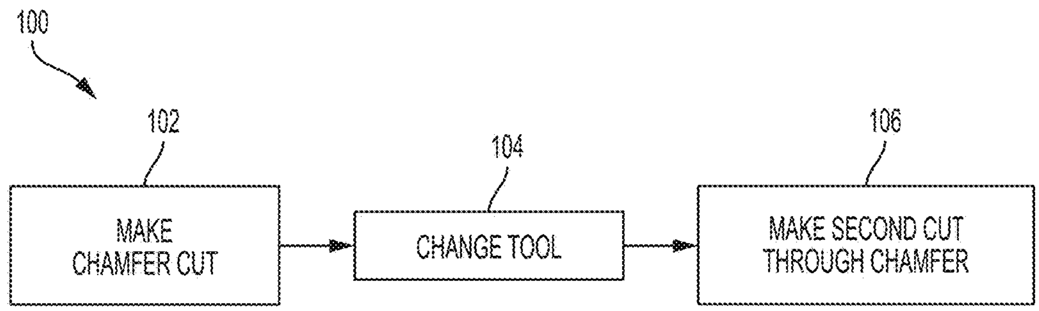
FIG. 5 is a flowchart of a multiple-cut method of machining a component including dissimilar materials, according to an embodiment.

While the disclosed multiple-cut method 100 has been described above with respect to a SSG assembly 10, the method may be applied to any machining operation involving dissimilar materials. With reference to FIG. 5, the method 100 generally includes three steps—making a chamfer cut, changing the tool, and making a second cut through the chamfer. In step 102, the chamfer cut is made. As described above, the chamfer cut may expose a chamfer surface on a component including dissimilar materials. The component may include at least two dissimilar materials, such as at least 3, 4, 5, or more dissimilar materials. As described above, dissimilar materials may include materials with different compositions or different properties. In one embodiment, the dissimilar materials have different hardnesses. The dissimilar materials may be adjacent to one another in at least a portion of the component. In one embodiment, the hardest material in the component may be on one edge or end of the component. In another embodiment, the hardest material may be disposed between other, softer materials.

The chamfer cut 102 may be configured to expose a chamfer surface that includes at least a portion, area, or region that does not include the hardest material in the component. Stated another way, the chamfer cut 102 may be configured to expose a chamfer surface that includes at least one material that is softer than the hardest material in the component. The chamfer cut may also be configured to expose a chamfer surface that provides a new cutting path through the component that does not include the hardest material in the component. As described above, the chamfer cut may be made at an angle relative to a surface of the hardest material. The angle of the chamfer cut may be within the ranges described above for the chamfer cut for the SSG assembly 10. In addition, the chamfer cut may be made with any suitable height (e.g., vertical distance), as described above.

In step 104, a tool change may be made from a first tool, which made the chamfer cut, to a second tool. The tool change may include changing the tool or the cutting insert on the same piece of machining equipment that made the chamfer cut. Alternatively, the component may be moved to another piece of machining equipment that has a second, different tool installed. Accordingly, the tool change step 104 may be accomplished in any manner that allows the component to be machined in a second machining operation by a different tool from the first tool. As described above, the tool or cutting insert types may be the same or different from the first tool to the second tool. Each tool may be chosen based on the type of material being cut, for example, the first tool may be designed for harder materials and the second tool may be designed for softer materials.

In step 106, a second cut is made on the component. The second cut may initially contact and cut through the chamfer surface created in step 102. The second cut may initially contact and cut through a portion, region, or area of the chamfer surface that does not include the hardest material in the component. Stated another way, the second cut may initially contact and cut through a portion, region, or area of the chamfer surface that includes at least one material that is softer than the hardest material in the component. Alternatively, the second cut may be performed in the opposite direction such that the cut exits the portion of the chamfer surface that includes at least one material that is softer than the hardest material. The second cut may extend through the component without contacting the hardest material in the component. The second cut may have any desired orientation or direction that is non-parallel to the chamfer surface.

With reference to FIGS. 6-7, examples are shown of the steps of a multiple-cut machining method on components having dissimilar materials. The components may be any type of component, not limited to the SSG assembly described above or automotive components. In FIG. 6A, a component 50 is shown that includes four dissimilar materials 52, 52', 52'', and 52'''. The materials are shown as adjacent and having the same general shape, however, the materials may have differing shapes from one another and may have any shape, including irregular shapes. In addition, the materials need not be aligned parallel to each other, but may have any spatial relationship. There is also no requirement that the transition surfaces or planes between materials be parallel to each other and/or perpendicular to the second cut path. The arrangement of the materials is merely exemplary and not to be construed as limiting.

In one embodiment, each material has a different hardness. In another embodiment, at least two of the materials have different hardnesses. While four materials are shown, there may be any number of materials greater than two, such that there are at least two dissimilar materials. For example, there may be 2, 3, 4, 5, 10 or more materials. In one embodiment, there are 2-10 differing materials, or any sub-range therein, such as 2-8, 2-5, 3-8, 3-6, or other sub-ranges. One material may be the hardest of the materials in the component 50. In the embodiment shown in FIGS. 6A-6D, material 52 is the hardest and is located on an edge or side of the component 50 (e.g., one side has a softer material contacting it and the opposing side free or open). Materials 52', 52'', and 52''' may have a lower hardness than material 52, and may have different hardness from each other. The materials may decrease in hardness as they extend away from material 52 (i.e., 52>52'>52''>52''') or the material hardnesses may be in any particular order (with 52 being the hardest).

Figure 6A:
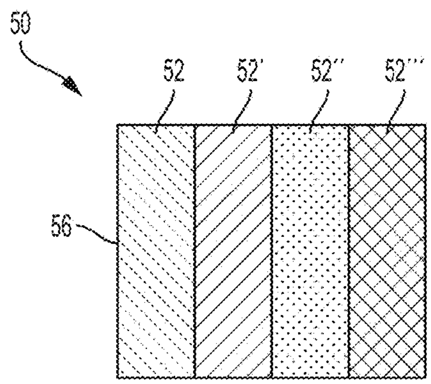
FIG. 6A is a schematic of a multiple-cut machining operation of a component including dissimilar materials, according to an embodiment.
Figure 6B:
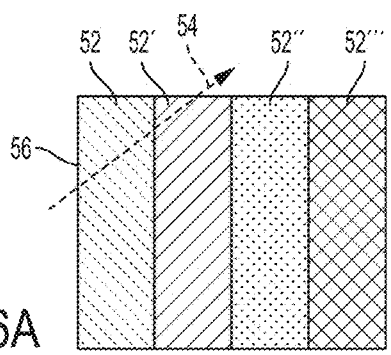
FIG. 6B is a schematic of a multiple-cut machining operation of a component including dissimilar materials, according to an embodiment.
Figure 6C:
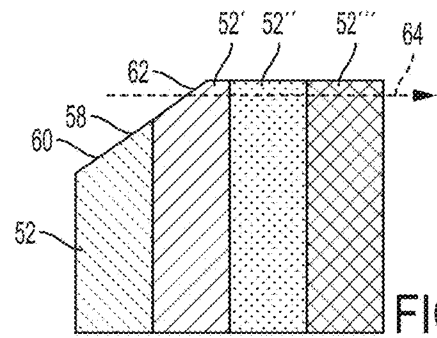
FIG. 6C is a schematic of a multiple-cut machining operation of a component including dissimilar materials, according to an embodiment.

In FIG. 6B, a chamfer cut path 54 is shown that extends through material 52 and 52'. Similar to described above, the chamfer cut path may be diagonal or oblique to a wall 56 of the material 52 at any suitable angle or height. As shown in FIG. 6C, after a chamfer cut is made along the chamfer cut path 54, a chamfer surface 58 is exposed in the component. The chamfer surface 58 includes a region 60 including the hardest material in the component 50 (material 52) and a region 62 including at least one material softer than the hardest material (in this embodiment, material 52'). As described above with respect to the SSG assembly, this may allow a second cut path 64 through the component 50 that does not extend through the hardest material 52. The second cut path 64 is shown as forming a cut similar to described above for the SSG assembly (e.g., forming a "flat" or horizontal surface perpendicular to the wall 56), however, the second cut path 64 may extend at any angle (other than parallel to the chamfer cut path 54).

Figure 6D:
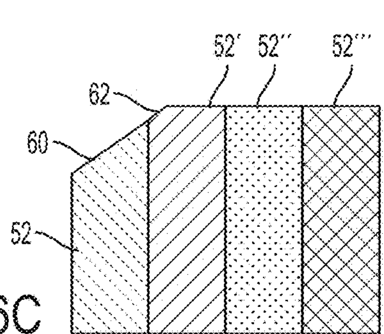
FIG. 6D is a schematic of a multiple-cut machining operation of a component including dissimilar materials, according to an embodiment.

The second cut path 64 may extend through the region 62 that includes at least one material softer than the hardest material. The second cut path 64 is shown as starting at region 62 and extending through materials 52', 52'', and 52''', in that order. However, the second cut path 64 could also start from the opposite side of the component 50 and extend in the order of 52''', 52'', 52', 62. In addition, there is no requirement that the cut 54 extend through all materials of the component 50. For example, an oblique cut could extend through region 62, material 52', and through the top of material 52'', thereby not extending through material 52'''. FIG. 6D shows the component 50 after both the chamfer cut and the second cut. As described above with respect to the SSG assembly, the disclosed multiple-cut machining operation may allow for the hardest material in a component to be avoided during a cutting process. This may allow for longer tool life, a smoother/better cut, and reduced waste in the second cut.

Figure 7A:
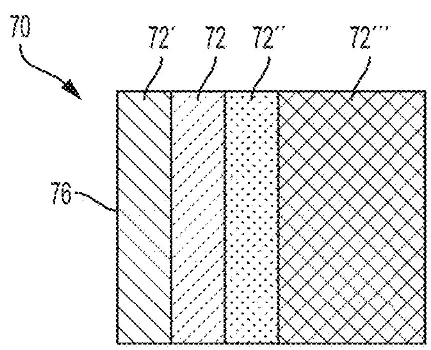
FIG. 7A is a schematic of a multiple-cut machining operation of a component including dissimilar materials, according to another embodiment.

With reference to FIGS. 7A-7D, another embodiment of a multiple-cut machining method on components having dissimilar materials. Again, the components may be any type of component, not limited to the SSG assembly described above or automotive components. In FIG. 7A, a component 70 is shown that includes four dissimilar materials 72, 72', 72", and 72'''. The materials are shown as adjacent and having the same general shape, however, the materials may have differing shapes from one another and may have any shape, including irregular shapes. In one embodiment, each material has a different hardness. In another embodiment, at least two of the materials have different hardnesses. Similar to above, while four materials are shown, there may be any number of materials greater than two, such that there are at least two dissimilar materials. One material may be the hardest of the materials in the component 70. In the embodiment shown in FIGS. 7A-7D, material 72 is the hardest. Materials 72', 72", and 72''' may have a lower hardness than material 72, and may have different hardness from each other. In contrast to FIGS. 6A-6D, however, the hardest material 72 is not located on an edge or side of the component 70, but located on an interior of the component. Accordingly, the material 72 may have at least one softer material on opposing sides thereof. The hardnesses of materials 72', 72", and 72''' may be in any particular order.

Figure 7B:
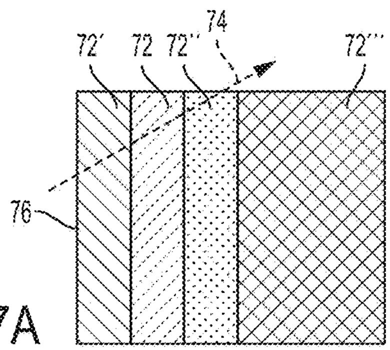
FIG. 7B is a schematic of a multiple-cut machining operation of a component including dissimilar materials, according to another embodiment.
Figure 7C:
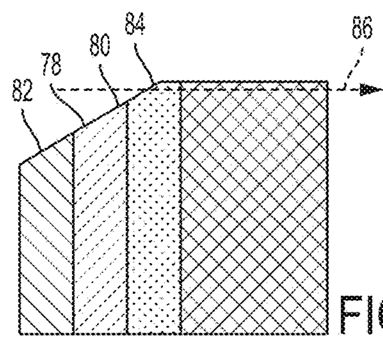
FIG. 7C is a schematic of a multiple-cut machining operation of a component including dissimilar materials, according to another embodiment.

In FIG. 7B, a chamfer cut path 74 is shown that extends through material 72', 72, and 72", in that order (or vice versa). Similar to described above, the chamfer cut path may be diagonal or oblique to a wall 76 of the material 72' at any suitable angle or height. As shown in FIG. 7C, after a chamfer cut is made along the chamfer cut path 74, a chamfer surface 78 is exposed in the component. The chamfer surface 78 includes a region 80 including the hardest material in the component 70 (material 72), a first region 82 including at least one material softer than the hardest material (in this embodiment, material 72'), and a second region 84 including at least one material softer than the hardest material (in this embodiment, material 72"). As described above with respect to the SSG assembly, this may allow a second cut path 86 through the component 70 that does not extend through the hardest material 72. The second cut path 86 is shown as forming a cut similar to described above for the SSG assembly (e.g., forming a "flat" or horizontal surface perpendicular to the wall 76), however, the second cut path 86 may extend at any angle (other than parallel to the chamfer cut path 74).

Figure 7D:
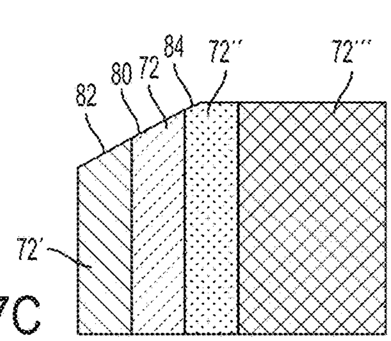
FIG. 7D is a schematic of a multiple-cut machining operation of a component including dissimilar materials, according to another embodiment.

The second cut path 86 may extend through the second region 84 that includes at least one material softer than the hardest material. The cut path in this embodiment could not extend through region 82 because such a cut path would also extend through the hardest material 72. The second cut path 86 is shown as starting at region 84 and extending through materials 72" and 72''', in that order. However, the second cut path 86 could also start from the opposite side of the component 70 and extend in the order of 72''', 72", 84. In addition, there is no requirement that the cut path 74 extend through all materials of the component 70. For example, an oblique cut could extend through region 84 and through the top of material 72", thereby not extending through material 72'''. FIG. 7D shows the component 70 after both the chamfer cut and the second cut. As described above with respect to the SSG assembly, the disclosed multiple-cut machining operation may allow for the hardest material in a component to be avoided during a cutting process. This may allow for longer tool life, a smoother/better cut, and reduced waste in the second cut. FIGS. 7A-7D show one example of the multiple-cut machining operation through a material in which the hardest material is not located on an edge. However, based on the present disclosure, one of ordinary skill in the art will appreciate that numerous combinations of component configurations, chamfer cut paths, and second cut paths may be performed.

As described above, the disclosed multiple-cut machining method may be performed on components including dissimilar materials. In one embodiment, the dissimilar material may all be metals. The dissimilar materials may be the same type of metal, such as different alloy compositions of the same alloy type (e.g., iron, steel, aluminum, or titanium alloys). The dissimilar materials may also be different metals or alloys, such as iron, aluminum, titanium, alloys thereof, or steel alloys. The dissimilar materials may also be the same composition but with different properties, such as hardness, strength, microstructure, grain size, or other properties. For example, a component with four dissimilar materials may include an aluminum material, two steel materials with the same composition but where one is case hardened and the other is not, and a fourth steel material with a different composition.

The hardest material in a component is relative, and may have any hardness value that is greater than the other materials. In at least one embodiment, the hardest material (e.g., materials 52, 72, or hardened surface 18) may have a hardness of at least 45 HRC. In another embodiment, the hardest material may have a hardness of at least 50 HRC. In another embodiment, the hardest material may have a hardness of at least 55 HRC. The other materials in the component may have any hardness that is less than the hardest material (e.g., less than 45, 50, or 55 HRC in the above embodiments). In at least one embodiment the materials other than the hardest material (e.g., 52', 52", 52''', or the weld 16 or shell 14) may have a hardness of at most 45 HRC. Accordingly, as described above, the disclosed multiple-cut machining method may remove a portion of a material having a hardness of at least 45, 50, or 55 HRC in a first cut. The first cut may expose a surface having at least one region that includes a material having a hardness of at most 45, 50, or 55 HRC. The first cut may also provide a new cutting path through multiple materials each having a hardness of at most 45, 50, or 55 HRC.

In the embodiments described above, each material has been described with a generally uniform hardness throughout. For example, in the SSG assembly 10, the materials were described as the gear 12 (having sub-materials 18 and 20), shell 14, and weld 16, wherein each material had a hardness value. However, it is also contemplated that a material may have a hardness gradient, such that the hardness of the material changes gradually or continuously from one end or surface to another. For example, if a material is hardened using a diffusion process (e.g., carburizing), the diffusing element may have a concentration gradient within the material such that there is a relatively high concentration in one region (e.g., the surface) that continuously decreases in a direction away from that region (e.g., towards an interior or bulk of the material). As a result, the material may have a hardness gradient corresponding to the concentration gradient of the diffusing element. While a diffusion process may form a material with such a gradient, one of ordinary skill in the art will appreciate that materials may have a hardness gradient due to other processes, as well.

Regarding the disclosed multiple-cut machining method, a transition point may be defined or selected for a material with gradually or continuously changing properties (e.g., hardness). Accordingly, for the purposes of the disclosed methods, the transition point may divide the material into two materials. A first cut may then be performed that removes at least a portion of the material on the side of the transition point that is harder. Similar to above, this may expose a region of the material that is on the softer side of the transition point, allowing for a new cutting path that extends through materials that are softer than the hardest portion of the material. For example, a material may have a hardness gradient that starts at 55 HRC at the surface and gradually reduces to 30 HRC in the bulk of the material. A transition point may be selected at an intermediate hardness value, such as where the hardness of the material is 40, 45, or 50 HRC. Using 45 HRC in this example, a first cut (e.g., chamfer cut) may be performed that removes at least a portion of the material that is at least 45 HRC and exposes at least a portion of the material that is at most 45 HRC. Therefore, a new cutting path may be exposed that allows for cutting through materials that have a hardness of at most 45 HRC.

The multiple-cut machining method has been described herein with respect to a turning operation (e.g., rotating work piece and non-rotating tool). However, the disclosed methods are applicable to any type of machining, and the method is not limited to turning operations. For example, the methods could be implemented using milling, cutting (e.g., sawing/shearing), drilling, grinding, boring, or other types of machining. In addition, the machining methods may be performed manually or using automated or semi-automated machinery, such as computer numerical control (CNC).

While the multiple-cut machining methods have been described and shown with two cuts (e.g., a first chamfer cut and a second cut), one or ordinary skill in the art will appreciate that, based on the present disclosure, more than two cuts may be performed. For example, two chamfer cuts may be performed in order to expose a surface that allows for a new cutting path. In some situations, one chamfer cut may not be sufficient or optimal. For example, if a component has a complex shape, it may not be possible to expose a desired cutting path through the softer materials with only a single chamfer cut. In other situations, it may be advantageous to make multiple chamfer cuts for tooling reasons, either to prolong tool life or to match tools to the materials being cut. Accordingly, it is also contemplated that if there are more than two cuts, there may be more than two tools or cutting inserts used.

Figure 8:
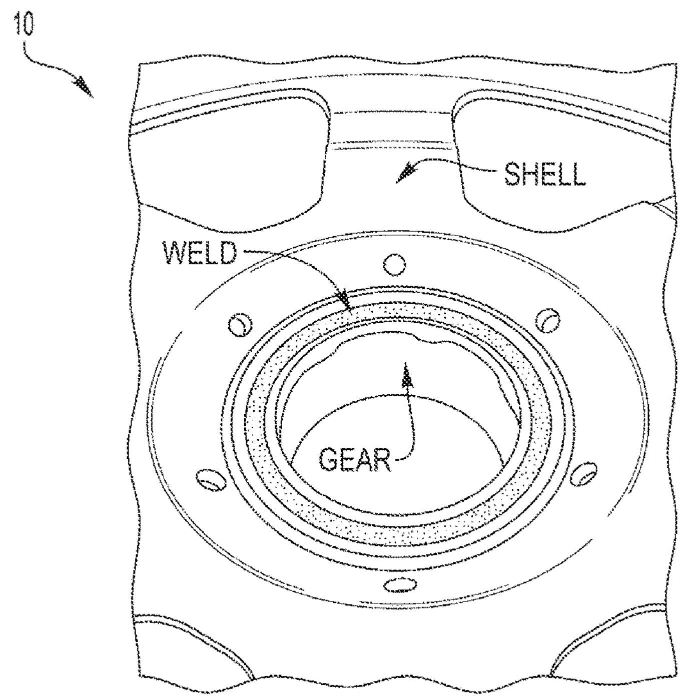
FIG. 8 is a photograph of a pre-machining shell and sun gear assembly.
Figure 9:
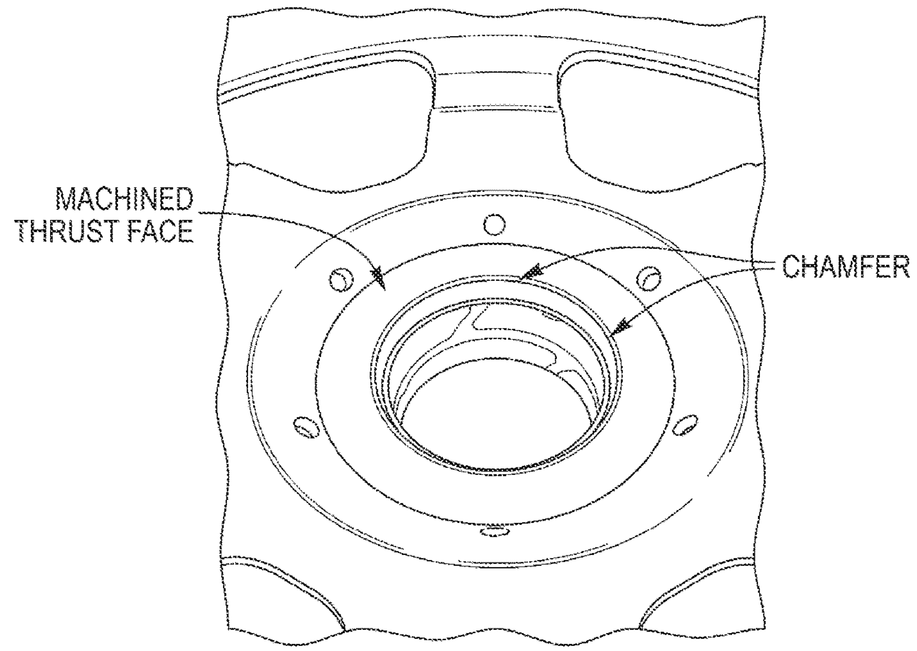
FIG. 9 is a photograph of a shell and sun gear assembly after a multiple-cut machining operation, according to an embodiment.

FIGS. 8-16 show examples of a SSG assembly machined according to an embodiment of the disclosed multiple-cut machining method. FIG. 8 shows a pre-machined SSG assembly with a gear welded to a shell. FIG. 9 shows the SSG assembly after the disclosed multiple-cut machining operation, with a bushing inserted into the gear. As shown in FIG. 9, a very clean, smooth, and flat thrust face was created during the second cut (thrust face surface cut). The chamfer from the first, chamfer cut is also shown.

Figure 10:
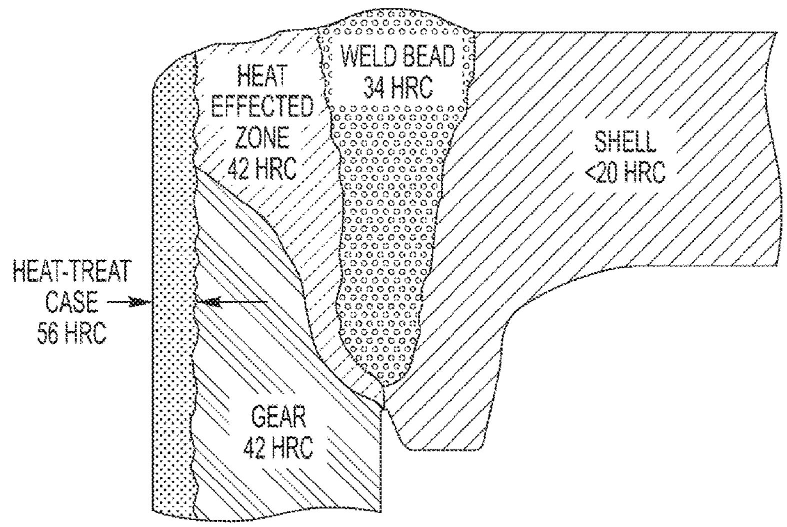
FIG. 10 is a cross-section of a shell and sun gear assembly prior to machining showing multiple dissimilar materials and their hardnesses.
Figure 11:
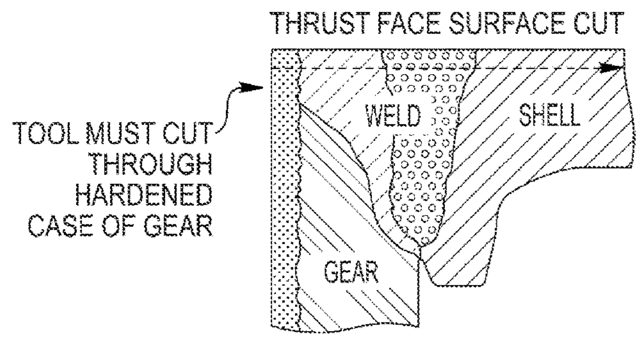
FIG. 11 is a schematic of the conventional single-cut machining operation superimposed on a cross-section of a shell and sun gear assembly.
Figure 12:
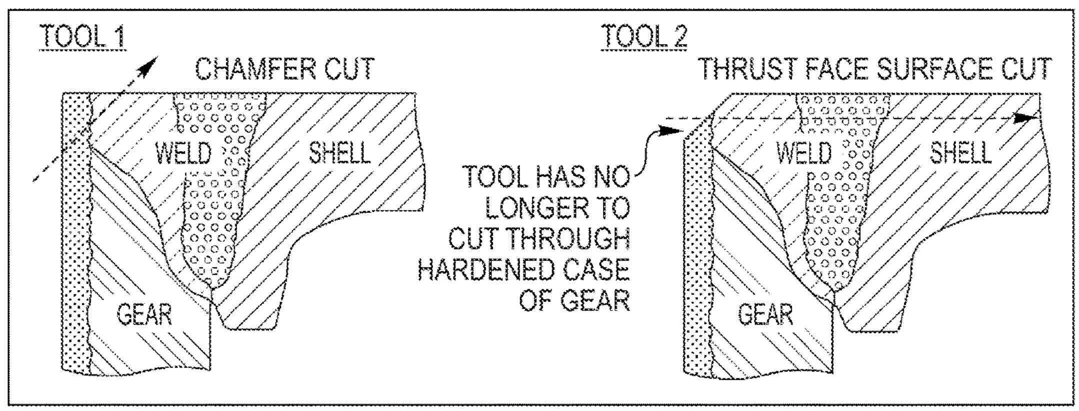
FIG. 12 is a schematic of a multiple-cut machining operation according to an embodiment superimposed on a cross-section of a shell and sun gear assembly.
Figure 13:
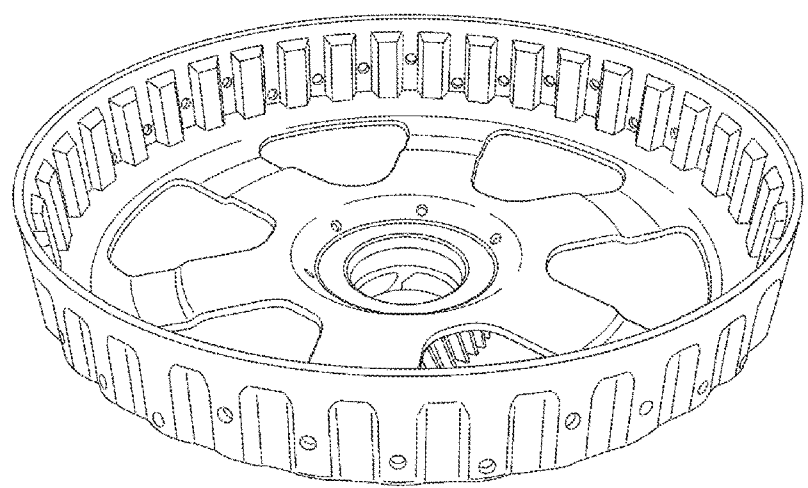
FIG. 13 is a perspective photograph of one side of a shell and sun gear assembly after a multiple-cut machining operation, according to an embodiment.
Figure 14:
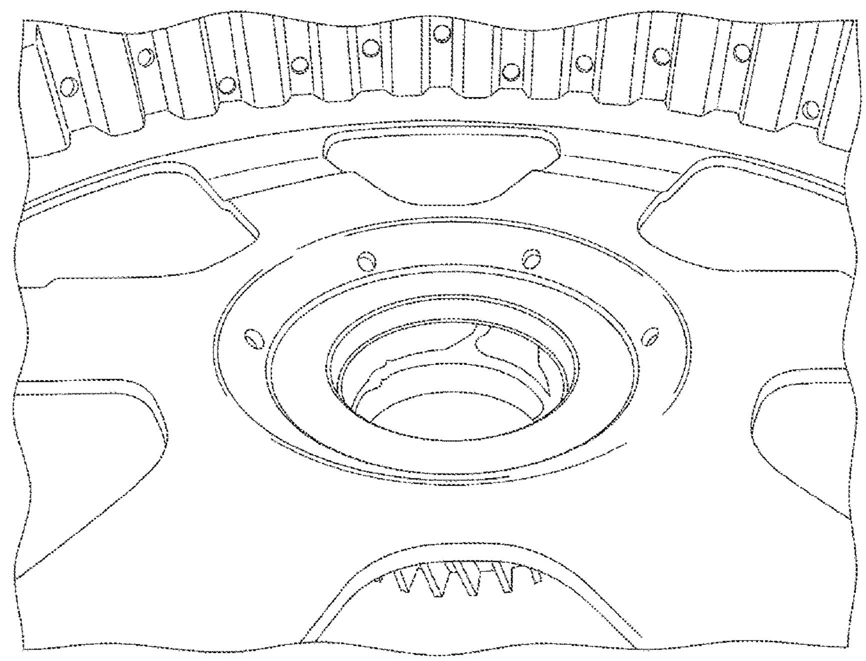
FIG. 14 is an enlarged photograph of FIG. 13.
Figure 15:
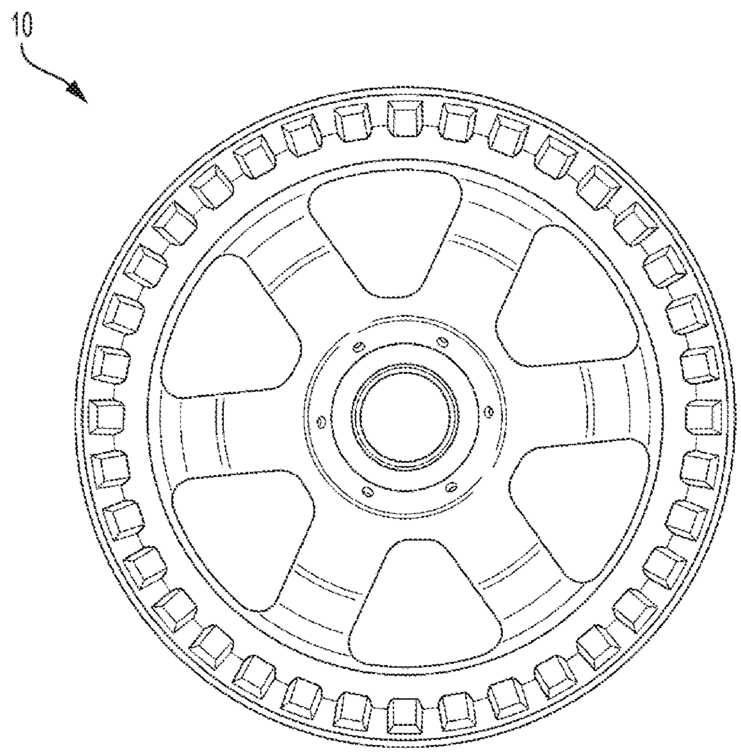
FIG. 15 is a plan-view photograph of one side of a shell and sun gear assembly after a multiple-cut machining operation, according to an embodiment.
Figure 16:
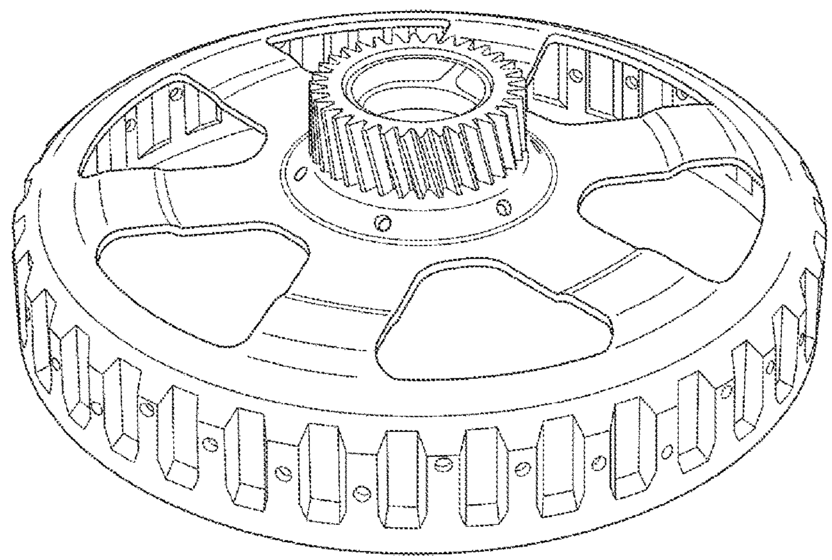
FIG. 16 is a perspective photograph of another side of a shell and sun gear assembly after a multiple-cut machining operation, according to an embodiment.

FIGS. 10-12 show cross-sections of the SSG assembly and comparisons between the conventional single-cut operation and the disclosed multiple-cut operation. FIG. 10 shows a cross-section of the SSG assembly and the hardnesses of the various materials within the assembly. As shown the gear has been surface or case-hardened to a hardness value of 56 HRC, compared to the bulk of the gear which is 42 HRC. The gear was welded to the shell, during which a weld bead and a heat affected zone (HAZ) were formed. The HAZ has a hardness that is the same or similar to the gear at 42 HRC, while the weld bead itself has a hardness of 34 HRC. The shell is softer than the gear, the HAZ, and the weld bead, with a hardness of less than 20 HRC.

FIG. 11 shows a schematic of the conventional single-cut operation superimposed on the cross-section of the SSG assembly. As shown, the tool must cut through the hardened outer surface or case of the gear in order to make the thrust face surface cut. FIG. 12 shows a schematic of the new disclosed multiple-cut operation superimposed on the cross-section of the SSG assembly. The operation included a first chamfer cut at an oblique angle relative to the wall of the gear. This chamfer cut removed a portion of the case-hardened portion of the gear, as well as a portion of the HAZ. The chamfer cut exposed a chamfer surface that includes a region of case hardened material and a region of HAZ, with possibly a region including some of the bulk of the gear.

The exposing of the chamfer surface allowed for a second, thrust face surface cut to extend through the HAZ, the weld bead, and the shell without having to cut through the hardened case of the gear. The tools used for the chamfer cut and the thrust face surface cut were different (although they may be the same type of tool). Since the chamfer cut's primary purpose for the SSG assembly is to expose the chamfer surface, wear or damage to the cutting edge of the first tool is not as problematic as it is for the single-cut approach and the tool can be used longer. Since the second tool no longer has to cut through the hardened surface of the gear, its life is also extended. FIGS. 13-16 show additional images of the SSG assembly at various angles and scales.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of machining a component including multiple dissimilar materials, comprising:

making a first cut in the component to remove at least a portion of a hardest material in the component, the component includes at least two materials having a hardness that is less than that of the hardest material; and making a second cut in the component along a second cutting-path that does not include the hardest material, the second cutting-path extends through each of the at least two materials having a hardness that is less than that of the hardest material, the first cut exposes a cut surface in the component and the second cut extends through the cut surface.

2. The method of claim 1, wherein the first and second cuts include a turning operation.

3. The method of claim 1, wherein the hardest material has a hardness of at least 50 HRC and the second cutting-path extends through materials having a hardness of at most 45 HRC.

4. The method of claim 1, wherein the first cut is made at an angle oblique to a surface of the hardest material and the second cut is made substantially perpendicular to the surface of the hardest material.

5. The method of claim 1, wherein the multiple dissimilar materials are all steel.

6. The method of claim 1, wherein the first cut initially contacts the hardest material.

7. A method of machining a component including multiple dissimilar materials, comprising:

making a first chamfer cut in the component to remove at least a portion of a hardest material in the component and expose a chamfer surface; and making a second cut in the component through the chamfer surface along a second cutting-path that consists of a plurality of materials that are softer than the hardest material.

8. The method of claim 7, wherein the chamfer surface includes a region of the hardest material and at least one region of a material softer than the hardest material.

9. The method of claim 7, wherein the first and second cuts include a turning operation and the first and second cuts are made using different cutting tools.

10. The method of claim 7, wherein the hardest material has a hardness of at least 50 HRC and the plurality of materials each have a hardness of at most 45 HRC.

11. The method of claim 7, wherein the first cut is made at an angle oblique to a surface of the hardest material and the second cut is made substantially perpendicular to the surface of the hardest material.

12. The method of claim 7, wherein the first cut initially contacts the hardest material.

13. The method of claim 7, wherein the first cut extends through at least three materials.

14. A method of machining a component including multiple dissimilar materials, comprising:

making a first cut in the component to remove at least a portion of a hardest material in the component; and making a second cut in the component along a second cutting-path that does not include the hardest material, the first cut and the second cut are made using different cutting tools, the first cut exposes a cut surface in the component and the second cut extends through the cut surface, and the first cut extends through at least three materials.

15. The method of claim 14, wherein the component includes at least two materials having a hardness that is less than that of the hardest material.

16. The method of claim 15, wherein the second cutting-path extends through each of the at least two materials having a hardness that is less than that of the hardest material.

17. The method of claim 14, wherein the first and second cuts include a turning operation.

18. The method of claim 14, wherein the multiple dissimilar materials are all steel.

19. The method of claim 14, wherein the first cut initially contacts the hardest material.

20. The method of claim 14, wherein the first cut is made at an angle oblique to a surface of the hardest material and the second cut is made substantially perpendicular to the surface of the hardest material.

* * * * *